(12) United States Patent
Kawano

(10) Patent No.: US 12,110,062 B2
(45) Date of Patent: Oct. 8, 2024

(54) CAR BODY PANEL STRUCTURE

(71) Applicant: Honda Motor Co., Ltd., Tokyo (JP)

(72) Inventor: Yuya Kawano, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 347 days.

(21) Appl. No.: 17/669,318

(22) Filed: Feb. 10, 2022

(65) Prior Publication Data

US 2022/0297762 A1 Sep. 22, 2022

(30) Foreign Application Priority Data

Mar. 18, 2021 (CN) .......................... 202110290927.3

(51) Int. Cl.
*B62D 25/14* (2006.01)
*B62D 25/08* (2006.01)
*B62D 25/20* (2006.01)
*B62D 27/02* (2006.01)

(52) U.S. Cl.
CPC .......... *B62D 25/14* (2013.01); *B62D 25/082* (2013.01); *B62D 25/2018* (2013.01); *B62D 25/2045* (2013.01); *B62D 27/02* (2013.01); *B62D 25/088* (2013.01)

(58) Field of Classification Search
CPC .. B62D 25/088; B62D 25/082; B62D 25/085; B62D 25/14; B62D 25/2045; B62D 25/2018; B62D 27/02
See application file for complete search history.

(56) References Cited

U.S. PATENT DOCUMENTS

| | | | | |
|---|---|---|---|---|
| 8,388,048 B2* | 3/2013 | Usuda | ................. | B62D 25/082 296/72 |
| 8,480,164 B2* | 7/2013 | Naoi | ...................... | B62D 25/14 296/193.09 |
| 8,485,591 B2* | 7/2013 | Kihara | ................. | B62D 25/082 296/203.02 |
| 9,598,119 B2* | 3/2017 | Kim | .................... | B62D 25/2018 |
| 9,630,656 B2* | 4/2017 | Yoshida | ............. | B62D 25/2018 |
| 10,023,240 B2* | 7/2018 | Mildner | ............... | B62D 25/088 |
| 11,858,554 B2* | 1/2024 | Song | ....................... | B62D 21/15 |
| 2018/0273097 A1* | 9/2018 | Kurokawa | ............. | B62D 27/02 |
| 2019/0152548 A1* | 5/2019 | Shimizu | ............... | B62D 21/152 |
| 2022/0315111 A1* | 10/2022 | Sotty | ...................... | B62D 21/15 |

FOREIGN PATENT DOCUMENTS

| | | | | |
|---|---|---|---|---|
| CN | 108706052 | | 10/2018 | |
| CN | 109808778 | | 5/2019 | |
| EP | 3018041 | A1 * | 5/2016 | ........... B62D 25/088 |
| JP | 06024358 | A * | 2/1994 | |
| JP | 06156320 | A * | 6/1994 | |
| JP | 2013136314 | A * | 7/2013 | |
| JP | 2015116880 | | 6/2015 | |
| JP | 2019171973 | | 10/2019 | |

OTHER PUBLICATIONS

Machine Translation of JP06024358 (Year: 2024).*
Machine Translation of JP06156320 (Year: 2024).*
Machine Translation of JP2013136314 (Year: 2024).*
"Office Action of China Counterpart Application", issued on Apr. 17, 2024, with English translation thereof, p. 1-p. 16.

* cited by examiner

*Primary Examiner* — Jason S Morrow
(74) *Attorney, Agent, or Firm* — JCIPRNET

(57) ABSTRACT

A car body panel structure includes a stress relieving part disposed on the car body panel and located between multiple connecting sides for connecting the car body panel and the frame component.

8 Claims, 3 Drawing Sheets

CAR BODY PANEL STRUCTURE

CROSS-REFERENCE TO RELATED APPLICATION

This application claims the priority benefit of China application serial no. 202110290927.3, filed on Mar. 18, 2021. The entirety of the above-mentioned patent application is hereby incorporated by reference herein and made a part of this specification.

BACKGROUND

Technical Field

The disclosure relates to a car body panel structure, and particularly relates to a car body panel structure of a vehicle.

Description of Related Art

In the vehicle manufacturing industry in the prior art, generally, a car body has a cabin (car interior) for passengers and an engine compartment configured in front of the cabin and accommodating an engine, etc., and a floor panel is disposed on the lower surface of the cabin. In the engine compartment, a pair of front side frames forming left and right frame parts extend along a front-rear direction. In addition, the floor panel is supported by a floor frame extending along the front-rear direction below the floor panel. Furthermore, a pair of front pillars and a pair of side sills are continuously formed at two corner parts of a front part of the cabin in a width direction of the car body, and a cowl board with a closed cross-sectional structure extending along the width direction is mounted between upper parts of the pair of front pillars. On a part surrounded by the floor panel and the cowl board, a dashboard lower section (dash panel) separating the engine compartment and the cabin is provided. Rear ends of the pair of front side frames are connected to the dashboard lower section. A suspension tower is fixed on the pair of front side frames connected to the dashboard lower section. The components here are bonded through welding. In the above structure of the prior art in which the suspension tower, the dashboard lower section, and the front side frames are bonded through welding, there are the following issues. That is, for example, when the car body is deformed when driven on an uneven road surface, since a load is input to a welding spot, cracks are likely to occur at an end part of the welding spot, which may cause peeling between the components bonded through welding.

In the prior art, a reinforcing component is configured on a suspension tower to suppress the cracking of welding-bonded parts due to an input load. However, when a vehicle is driven and a car body suddenly receives an external force, resulting in a thrust load, the generated torque will act on the welding-bonded parts between front side frames and a floor panel, resulting in stress concentration on parts of a car body panel corresponding to the welding-bonded parts, thereby causing damage, cracks, etc. of the car body panel.

In view of the above aspects, the disclosure provides a car body panel structure whose design only changes the shape of the existing car body panel, effectively disperses the stress caused by the repeated input of the load from a frame component on the car body panel, and suppresses stress concentration of the car body panel to prevent damage, cracks, etc. of the car body panel, thereby improving the rigidity and durability of the car body panel.

SUMMARY

The disclosure provides a car body panel structure, which includes a stress relieving part disposed on a car body panel and located between multiple connecting sides for connecting the car body panel and a frame component.

In order for the features and advantages of the disclosure to be more comprehensible, specific embodiments are described in detail as follows in conjunction with drawings.

DETAILED DESCRIPTION OF DISCLOSED EMBODIMENTS

Figure 1:
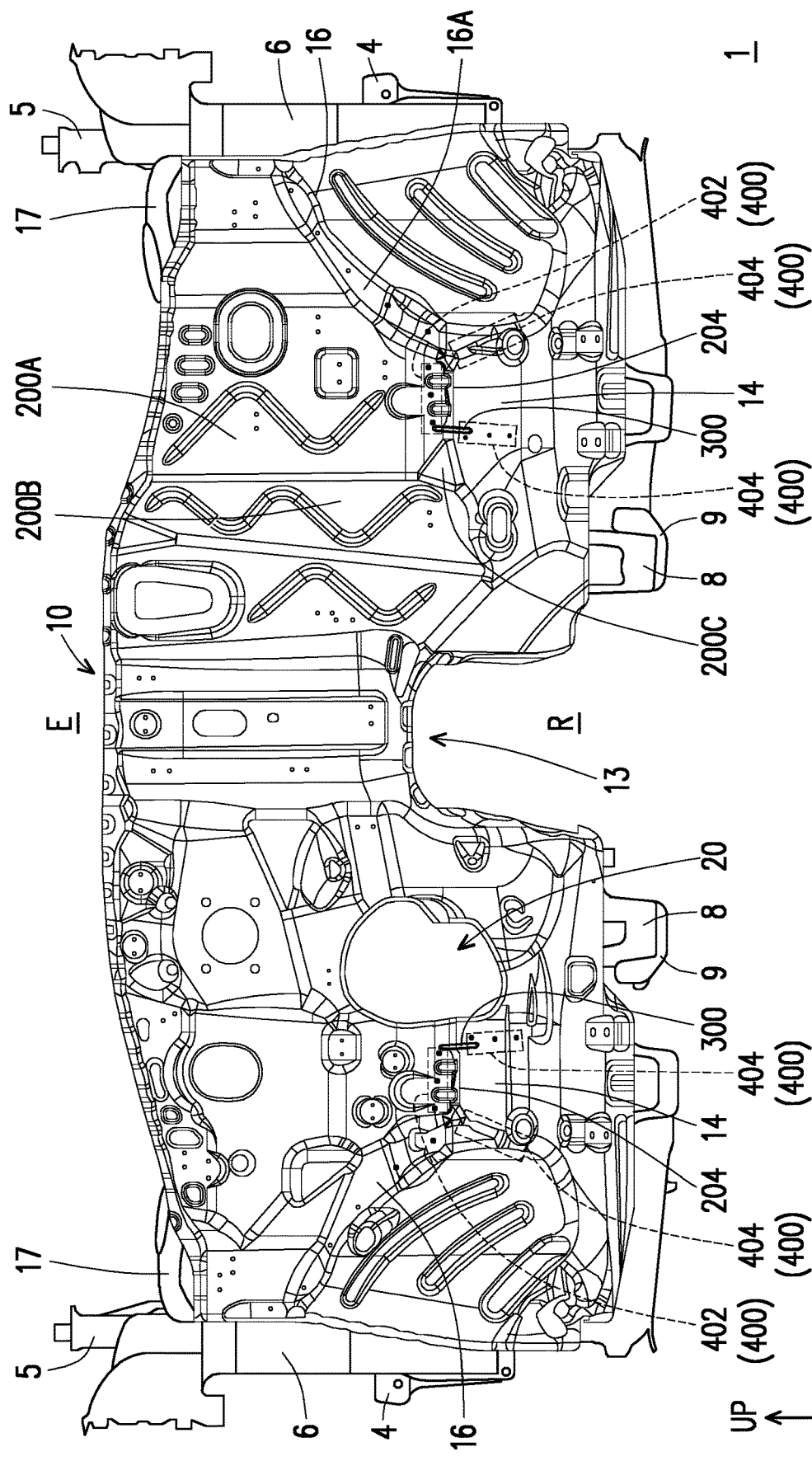
FIG. 1 is a schematic diagram of a car body panel structure according to an embodiment of the disclosure.

Hereinafter, embodiments of the disclosure will be described based on the drawings. It should be noted that in each embodiment described below, the same reference numerals are given to common parts, and repeated descriptions are omitted. Hereinafter, embodiments of the disclosure will be described with reference to the drawings. In the embodiments described below, when mentioning a number, an amount, etc., the scope of the disclosure is not necessarily limited to the number, the amount, etc. unless particularly described. In addition, in the following embodiments, each constituent element is not necessarily essential to the disclosure unless particularly described. In addition, when there are multiple embodiments below, the characteristic parts of the embodiments that can be appropriately combined are predetermined from the beginning unless particularly described.

With reference to the drawings, a car body panel structure of each embodiment of the disclosure will be described. FR in each drawing represents a front direction of a front-rear direction of a vehicle, UP represents an upper direction of an up-down direction of the vehicle, and IN represents an inner side direction of a width direction of the vehicle. In addition, directions and positions described in the specification of the disclosure are all defined on the premise that the front of the vehicle is facing forward.

Figure 2:
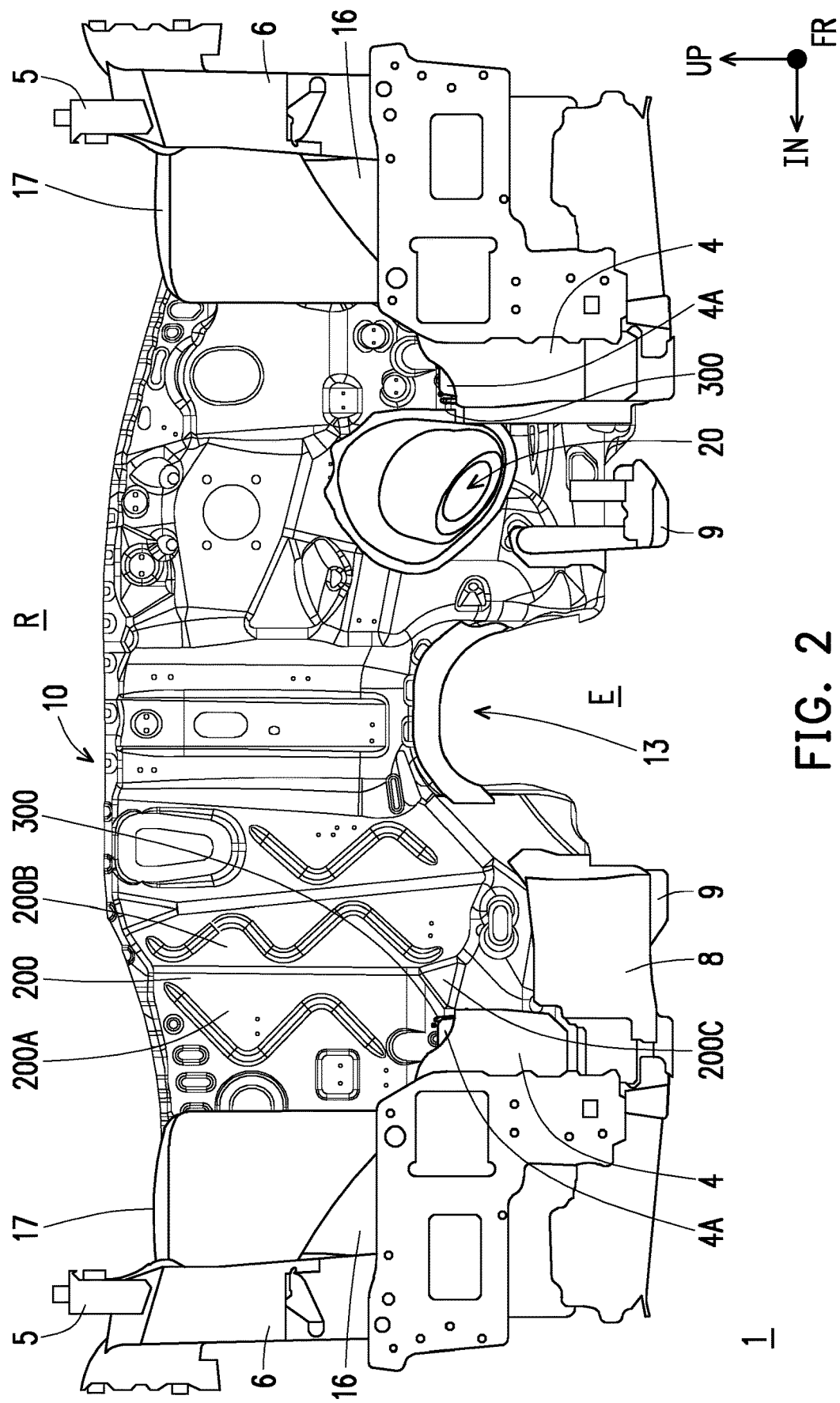
FIG. 2 is a schematic diagram of the car body panel structure of FIG. 1 viewed from another side.
Figure 3:
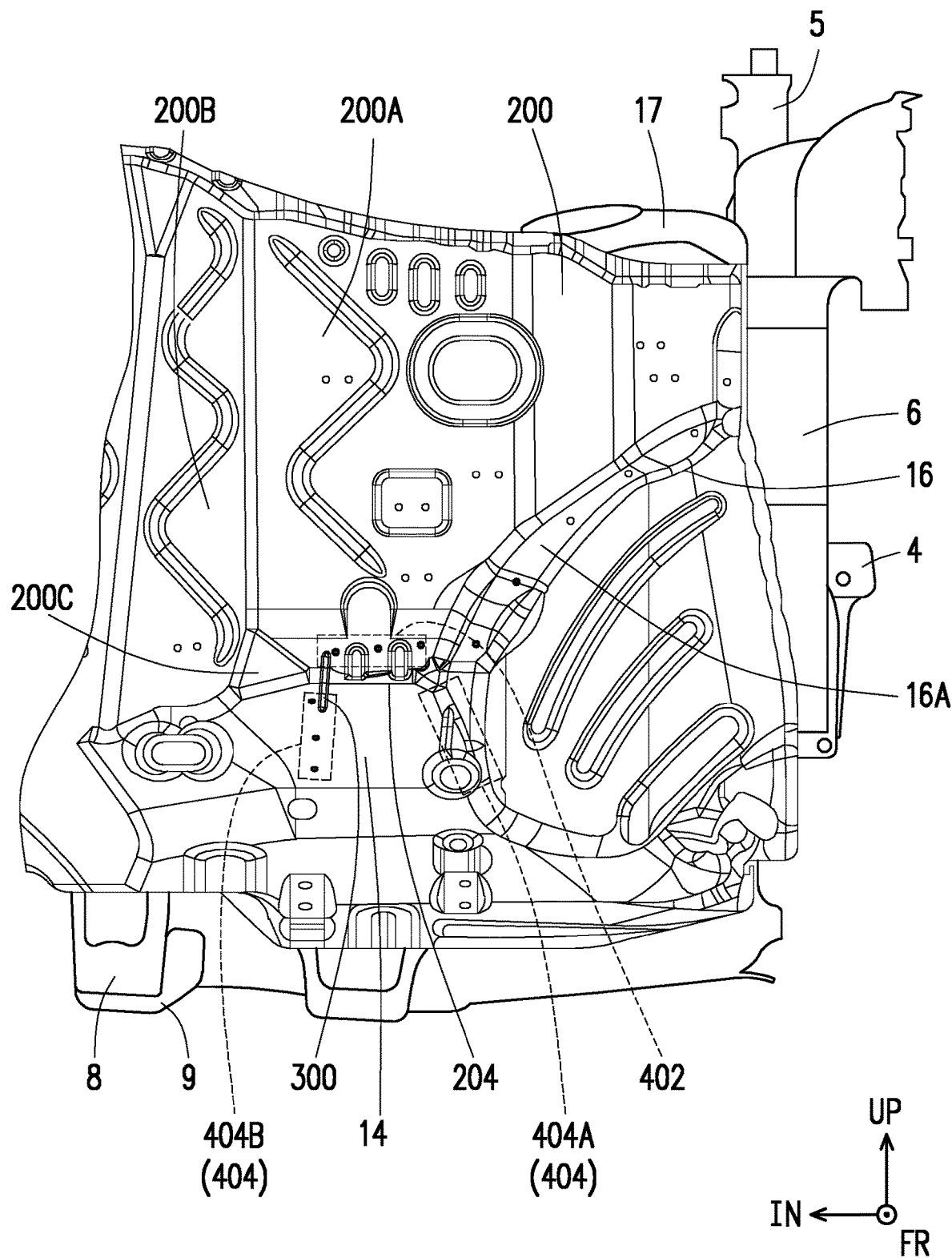
FIG. 3 is a partially enlarged schematic diagram of the car body panel structure of FIG. 1.

FIG. 1 is a schematic diagram of a car body panel structure according to an embodiment of the disclosure. FIG. 2 is a schematic diagram of the car body panel structure of FIG. 1 viewed from another side. FIG. 3 is a partially enlarged schematic diagram of the car body panel structure of FIG. 1. In FIG. 1, the direction out of plane of paper represents a rear direction of the vehicle, and the direction into plane of paper represents the front direction of the vehicle.

As shown in FIG. 1, a car body panel structure 1 has front side frames 4 configured at the front and forming left and right frame parts of an engine compartment E; front pillars 5 configured behind the front side frames 4 and with left and right outer sides extending along the up-down direction; upper members 6 configured above the two front side frames 4, with each front end bonded to a front end of the front side frame 4, and with each rear end bonded to the front pillar 5;

and a dash panel 200 separating the engine compartment E and a cabin R configured behind the engine compartment E and bonded to the front side frames 4, the front pillars 5, and the upper members 6.

The dash panel 200 is a part formed by performing a pressing operation, etc. on a flat component (for example, a metal component). Wheel housings 16 are respectively provided on left and right sides of the dash panel 200. Each wheel housing 16 is formed such that each wheel housing 16 bulges toward the cabin R side. A shock absorber housing 17 is disposed above the front side frame 4. The shock absorber housing 17 is also referred to as a suspension tower. The shock absorber housing 17 is fixed to an upper side of the front side frame. In addition, floor panels 9 are bonded to a flange part of a lower part of the dash panel 200. Also, the floor panels 9 are bonded to side sills 8 configured at left and right sides thereof and respectively extending along the front-rear direction. Moreover, the floor panels 9 are supported by a floor frame configured below and extending along the front-rear direction. At a center part in a width direction of the dash panel 200, a tunnel part 13 bulging upward is integrally formed. Toe boards 14 are disposed on a left side and a right side separating the tunnel part 13. In addition, at a position between the toe board 14 and a center part of the dash panel 200, a steering opening part 20 communicating the engine compartment E and the cabin R is formed. The steering opening part 20 is configured to penetrate a steering shaft of the vehicle.

Please refer to FIG. 1 to FIG. 3. A car body panel 10 and the front side frames 4 (hereinafter referred to as a frame component 4) in the car body panel structure 1 are bonded through welding. For example, connecting sides 400 bonding the car body panel 10 and the frame component 4 may be formed through spot welding. As shown in FIG. 3, the car body panel 10 and the frame component 4 may be bonded through spot welding at predetermined intervals. In this way, the car body panel 10 and the frame component 4 can be firmly connected to improve the overall rigidity of the car body panel structure 1.

In addition, in the embodiment, the frame component 4 and components forming the connecting sides 400 are all individual components that are separately formed. The frame component 4 is connected to the car body panel 10 through a connecting flange part 4A formed by a separate component to form the connecting sides 400.

According to the structures of the components of the car body panel in the embodiment, as shown in FIG. 2, the frame component 4 and the connecting sides 400 for connecting the frame component 4 to other components are individually formed by using separate components, instead of integrally forming the frame component 4 and the connecting sides 400, and the connecting flange part 4A formed by the separate component is disposed on a part of the frame component 4 where the connecting side 400 is to be formed.

Therefore, during the production process, when the frame component 4 and the car body panel 10 are shared by different vehicle models, since the standard of each component is different, in order to ensure that the components can both meet the common conditions, the connecting parts are usually made larger than actual requirements. As a result, the sizes of the components will increase and the connecting parts with the larger sizes will also cause a distance between the components to be connected, which may cause stress concentration more easily. As in the embodiment, as shown in FIG. 2, through disposing the connecting flange part 4A formed by the separate component on the part of the frame component 4 where the connecting side 400 is to be formed, even when a larger size is selected to be used for the frame component 4, since the connecting flange part 4A is formed by the separate component, through connecting the connecting flange part 4A between the frame component 4 and the car body panel 10, and through disposing a stress relieving part 300 on the car body panel 10, the stress concentrated on the car body panel 10 can be dispersed to prevent damage, cracks, etc. of the car body panel 10. In addition, the sharing of components with different models can be simpler.

As shown in FIG. 1 and FIG. 2, in the car body panel structure 1 of the embodiment, the connecting sides 400 bonding the car body panel 10 and the frame component 4 are illustrated by, for example, three connecting sides. The stress relieving part 300 is disposed between the connecting sides 400. The stress relieving part 300 is disposed on the car body panel 10 and is located between the connecting sides 400. In FIG. 1 and FIG. 2, on the left side and the right side of the car body panel 10 separating the tunnel part 13, at least one stress relieving part 300 is disposed between the connecting sides 400.

Through disposing the stress relieving part 300 between the connecting sides 400 of the car body panel 10 for connecting the car body panel 10 and the frame component 4, the stress relieving part 300 dispersing stress may be formed on a part of the car body panel 10 where stress concentration may occur. Therefore, the design only changes the shape of the existing car body panel 10, effectively disperses the stress caused by the repeated input of the load from the frame component 4 on the car body panel 10, and suppresses stress concentration between the connecting sides 400 of the car body panel 10 to prevent damage, cracks, etc. of the car body panel, thereby improving the rigidity and durability of the car body panel 10. In addition, the stress relieving part 300 may be easily formed by a pressing operation, thereby simplifying the manufacturing process of the car body panel 10 to greatly reduce the manufacturing cost.

As shown in FIG. 3, the connecting sides 400 include an upper part connecting side 402 and a side wall connecting side 404. The upper part connecting side 402 is located on a part of an upper side of the frame component 4 disposed with the shock absorber housing 17 closer to an inner side of a car body. The upper part connecting side 402 is connected between the upper side of the frame component 4 and the dash panel 200. The side wall connecting side 404 is connected between the toe board 14 and an inner end side of the frame component 4. As shown in FIG. 3, the stress relieving part 300 is formed between the upper part connecting side 402 and the side part connecting side 404.

In the embodiment, the shock absorber housing 17 and the dash panel 200 are connected to the upper side of the frame component 4. The shock absorber housing 17 is disposed on an outer side of the car body, in contrast, the dash panel 200 is closer to an inner side of the car body, and the inner end side of the frame component 4 (that is, a part of the frame component 4 located on the extreme end of the inner side of the car body connected to the car body panel 10) is connected to the toe board 14.

Stress concentration usually occurs at the parts where the connecting sides 400 are formed. For example, when a vehicle is driven and the car body suddenly receives an external force, resulting in a thrust load, the generated torque will act on welding-bonded parts between the frame component 4 and a floor panel 9, resulting in stress concentration on parts of the car body panel 10 corresponding to the welding-bonded parts. For example, stress concentration may occur at parts such as the upper part connecting side 402 and the side part connecting side 404. If the stress is not dispersed, damage, cracks, etc. of the car body panel 10 may result. In this way, the stress relieving part 300 is disposed between the upper part connecting side 402 and the side part connecting side 404 to disperse the stress. When the car body suddenly receives an external force, the car body may be deformed and the stress may be dispersed through disposing the stress relieving part to prevent damage, cracks, etc. of the car body panel 10.

In addition, as shown in FIG. 3, the side part connecting side 404 may be formed by a first side part connecting side 404A and a second side part connecting side 404B. The first side part connecting side 404A is disposed adjacent to the wheel housing 16 of the car body panel 10. The second side part connecting side 404B is opposite to the first side part connecting side 404A in the width direction of the car body, and the second side part connecting side 404B is located more inside in the width direction of the car body than the first side part connecting side 404A. The stress relieving part 300 is formed between the second side part connecting side 404B and the upper part connecting side 402.

In the embodiment, the wheel housing 16 is disposed between an outermost side of the car body panel 10 and the toe board 14. The wheel housing 16 has a main arch part 16A for accommodating wheels. There are ridges between the main arch part 16A, the toe board 14, and the dash panel 200. The first side part connecting side 404A is disposed adjacent to the wheel housing 16, that is, the first side part connecting side 404A is disposed adjacent to the ridge of the main arch part 16A. The second side part connecting side 404B and the first side wall connecting side 404A are separated by a distance in the width direction. The stress relieving part 300 is disposed in the vicinity of the second side part connecting side 404B at a distance from the ridge of the main arch part 16A of the wheel housing 16, that is, the stress relieving part 300 is disposed between the second side part connecting side 404B and the upper part connecting side 402, and the stress relieving part 300 is not disposed on the first side part connecting side 404A with the ridge, so that the deformation of the first side part connecting side 404A is suppressed through the ridge of the wheel housing 16 and the stress is dispersed through disposing the stress relieving part 300 beside the second side part connecting side 404B to alleviate the stress concentration to effectively prevent damage, cracks, etc. of the car body panel 10.

In addition, as shown in FIG. 3, each stress relieving part 300 is, for example, a bead formed by processing to change the shape of the car body panel 10, for example, a bead formed in a substantially linear shape. In the embodiment, the manner of forming the stress relieving part 300 is to form an arc-shaped (substantially semicircular) cross-sectional shape through, for example, a pressing operation or compression molding. If a surface of the car body panel 10 on the engine compartment E side is observed, the stress relieving part 300 is in a state of recessing from the engine compartment E side toward the cabin R side. If a surface of the car body panel 10 on the cabin R side is observed, the stress relieving part 300 is in a state of protruding from the engine compartment E side toward the cabin R side.

As shown in FIG. 3, the stress relieving part 300 overlaps with the upper part connecting side 402 and the side part connecting side 404 at least in the up-down direction of the car body. In the embodiment, as shown in FIG. 3, the stress relieving part 300 overlaps with the upper part connecting side 402 and the second side part connecting side 404B in the up-down direction of the car body.

Through configuring the stress relieving part 300 to overlap with the upper part connecting side 402 and the side part connecting side 404 at least in the up-down direction of the car body, when the car body suddenly receives an external force, the upper part connecting side 402 and the side wall connecting side 404 can be more easily deformed to effectively disperse stress to prevent damage, cracks, etc. of the car body panel 10.

In addition, the stress relieving part 300 is formed such that an end part 300A in a longitudinal direction of the stress relieving part 300 has a tapered shape. As shown in FIG. 3, the two end parts 300A of the stress relieving part 300 are both formed such that cross sections of parts closer to end points become smaller gradually. In this way, the productivity of the pressing operation of the car body panel 10 can be improved. For example, the shape of a mold (for example, a pressing head) used in the pressing operation is simple, so the manufacturing and maintenance operations of the mold become simple, and in addition to improving the overall structural strength of the car body panel structure 1, the stress relieving part 300 extending substantially linearly in the up-down direction may also be easily formed by the pressing operation on the dash panel 200. As a result, the productivity of the pressing operation of the car body panel 10 can be improved, so that the manufacturing process of the car body panel 10 can be simplified to greatly reduce the manufacturing cost.

In addition, the dash panel 200 has a vertical surface part 200A and an inclined surface part 200B adjacent to the vertical surface part 200A and not coplanar with the vertical surface part 200A. As shown in FIG. 1, the vertical surface part 200A, the inclined surface part 200B, and the toe board 14 converge to form a convergence part 200C. The stress relieving part 300 is formed between the convergence part 200C and the connecting side 400.

The vertical surface part 200A and the inclined surface part 200B of the dash panel 200 and the toe board 14 are three surfaces that are not coplanar with one another. The three non-coplanar surfaces converge to form the convergence part 200C. As shown in FIG. 1, in the embodiment, the stress relieving part 300 is disposed between the convergence part 200C and the upper part connecting side 402, and the stress relieving part 300 is disposed to extend in the up-down direction. Therefore, the stress relieving part 300 is located between the convergence part 200C and the upper part connecting side 402, and overlaps with the second side part connecting side 404B. The convergence part 200C generates stress concentration. Through forming the stress relieving part 300 between the convergence part 200C and the second side part connecting side 404B, when the car body suddenly receives an external force, the stress can be effectively dispersed to prevent damage, cracks, etc. of the convergence part 200C of the car body panel 10.

In addition, the dash panel 200 and the toe board 14 are not coplanar, so that the car body panel 10 is curved to form a curved bent part 204 connected between the dash panel 200 and the toe board 14, and the stress relieving part 300 is configured on the car body panel 10 by spanning the curved bent part 204. In this way, through configuring the stress relieving part 300 on the car body panel 10 by the curved bent part 204 spanning between the dash panel 200 and the toe board 14, when the car body suddenly receives an external force, the curved bent part 204 can be easily deformed through the deformation of the stress relieving part 300 to effectively disperse stress to prevent damage, cracks, etc. of car body panel 10.

In summary, in the car body panel structure 1 of the disclosure, the stress relieving part 300 is disposed between the connecting sides 400 for connecting the car body panel 10 and the frame component 4, and the stress relieving part 300 is formed at parts of the car body panel 10 where stress concentration may occur. Accordingly, the design only changes the shape of the existing car body panel 10, effectively disperses the stress caused by the repeated input of the load from the frame component 4 on the car body panel 10, and suppresses the stress concentration of the car body panel 10 to prevent damage, cracks, etc. of the car body panel 10, thereby improving the rigidity and durability of the car body panel. In addition, the stress relieving part may be easily formed by the pressing operation, thereby simplifying the manufacturing process of the car body panel to greatly reduce the manufacturing cost.

According to the disclosure, the stress relieving part is disposed on the car body panel, and the stress relieving part is disposed between the connecting sides for connecting the car body panel and the frame component. In other words, the stress relieving part dispersing stress is formed on a part of the car body panel where stress concentration may occur. Therefore, the design only changes the shape of the existing car body panel, effectively disperses the stress caused by the repeated input of the load from a frame component on the car body panel, and suppresses stress concentration between the connecting sides of the car body panel to prevent damage, cracks, etc. of the car body panel, thereby improving the rigidity and durability of the car body panel. In addition, the stress relieving part may be easily formed by a pressing operation, thereby simplifying the manufacturing process of the car body panel to greatly reduce the manufacturing cost.

In addition, in the disclosure, the car body panel has a dash panel and a toe board. The frame component has a shock absorber housing. The shock absorber housing is fixed to un upper side of the frame component. The connecting sides include an upper part connecting side connected between the upper side of the frame component and the dash panel, and a side part connecting side connected between the toe board and an inner end side of the frame component. The stress relieving part is formed between the upper part connecting side and the side part connecting side.

According to the above structure, stress concentration usually occurs at parts where the connecting sides are formed. For example, when a vehicle is driven and a car body suddenly receives an external force, resulting in a thrust load, the generated torque will act on welding-bonded parts between the frame component and a floor panel, resulting in stress concentration on parts of the car body panel corresponding to the welding-bonded parts. For example, stress concentration may occur at parts such as the upper part connecting side and the side part connecting side. If the stress is not dispersed, damage, cracks, etc. of the car body panel may result. In this way, the stress relieving part is disposed between the upper part connecting side and the side part connecting side to disperse the stress. When the car body suddenly receives an external force, the car body may be deformed and the stress may be dispersed through disposing the stress relieving part to prevent damage, cracks, etc. of the car body panel.

In addition, in the disclosure, the car body panel has a curved bent part connected between the dash panel and the toe board. The stress relieving part is configured on the car body panel by spanning the curved bent part.

According to the above structure, through configuring the stress relieving part on the car body panel by the curved bent part spanning between the dash panel and the toe board, the curved bent part can be easily deformed through the deformation of the stress relieving part to effectively disperse stress to prevent damage, cracks, etc. of car body panel.

In addition, in the disclosure, the side part connecting side is formed by a first side part connecting side and a second side part connecting side. The first side part connecting side is adjacently connected to a wheel housing of the car body panel. The second side part connecting side is opposite to the first side part connecting side in a width direction of the car body, and the second side part connecting side is located more inside in the width direction of the car body than the first side part connecting side. The stress relieving part is formed between the second side part connecting side and the upper part connecting side.

According to the above structure, the stress relieving part is disposed in the vicinity of the second side part connecting side at a distance from a ridge of the wheel housing, that is, the stress relieving part is disposed between the second side part connecting side and the upper part connecting side, and the stress relieving part is not disposed on the first side part connecting side with a ridge, so that the deformation of the first side part connecting side is suppressed through the ridge of the wheel housing and the stress is dispersed through disposing the stress relieving part beside the second side part connecting side to alleviate the stress concentration to effectively prevent damage, cracks, etc. of the car body panel and improve the overall rigidity of the car body panel.

Furthermore, in the disclosure, the stress relieving part overlaps with the upper part connecting side and the side part connecting side at least in an up-down direction of the car body.

According to the above structure, through disposing the stress relieving part to overlap with the upper part connecting side and the side part connecting side at least in the up-down direction of the car body, the upper part connecting side and the side part connecting side can be more easily deformed to effectively disperse stress to prevent damage, cracks, etc. of the car body panel.

Furthermore, in the disclosure, the stress relieving part is formed such that an end part in a longitudinal direction of the stress relieving part has a tapered shape.

According to the above structure, through forming the stress relieving part such that the end part in the longitudinal direction of the stress relieving part has a tapered shape, the productivity of the pressing operation of the car body panel can be improved. For example, the shape of a mold used in the pressing operation is simple, so the manufacturing and maintenance operations of the mold become simple, thereby improving the productivity of the pressing operation of the car body panel.

Also, in the disclosure, the frame component has a connecting flange part formed by a separate component. The frame component is connected to the car body panel through the connecting flange part to form the connecting sides.

According to the above structure, the frame component and the connecting sides for connecting the frame component to other components are individually formed by using separate components, instead of integrally forming the frame component and the connecting sides, and the connecting flange part formed by the separate component is disposed on a part of the frame component where the connecting side is to be formed. In this way, even when a larger size is selected to be used for the frame component, since the connecting flange part is formed by the separate component, through connecting the connecting flange part between the frame component and the car body panel, and through disposing the stress relieving part on the car body panel, the stress concentrated on the car body panel can be dispersed to prevent damage, cracks, etc. of the car body panel. In addition, the sharing of components with different models can be simpler.

Also, in the disclosure, the dash panel has a vertical surface part and an inclined surface part adjacent to the vertical surface part and not coplanar with the vertical surface part. The vertical surface part, the inclined surface part, and the toe board converge to form a convergence part. The stress relieving part is formed between the convergence part and the connecting side.

According to the structure, the vertical surface part and the inclined surface part of the dash panel and the toe board are three surfaces that are not coplanar with one another. The three non-coplanar surfaces converge to form the convergence part. The convergence part generates stress concentration. Through forming the stress relieving part between the convergence part and the connecting side, the stress can be effectively dispersed to prevent damage, cracks, etc. of the convergence part of the car body panel.

Furthermore, in the disclosure, the connecting sides bonding the car body panel and the frame component are formed through spot welding.

According to the above structure, the connecting sides bonding the car body panel and the frame component are formed through spot welding, that is, the car body panel and the frame component are bonded by spot welding at predetermined intervals to firmly connect the car body panel and the frame component to improve the overall rigidity of the car body panel structure.

Based on the above, in the car body panel structure of the disclosure, the stress relieving part is disposed between the connecting sides for connecting the car body panel and the frame component, and the stress relieving part is formed at parts of the car body panel where stress concentration may occur. Accordingly, the design only changes the shape of the existing car body panel, effectively disperses the stress caused by the repeated input of the load from the frame component on the car body panel, and suppresses the stress concentration of the car body panel to prevent damage, cracks, etc. of the car body panel, thereby improving the rigidity and durability of the car body panel. In addition, the stress relieving part may be easily formed by the pressing operation, thereby simplifying the manufacturing process of the car body panel to greatly reduce the manufacturing cost.

Finally, it should be noted that the above embodiments are only used to illustrate, but not to limit, the technical solutions of the disclosure. Although the disclosure has been described in detail with reference to the above embodiments, persons skilled in the art should understand that they can still modify the technical solutions described in the above embodiments or equivalently replace some or all of the technical features, but the modifications or replacements do not cause the essence of the corresponding technical solutions to deviate from the scope of the technical solutions of the embodiments of the disclosure.

What is claimed is:

1. A car body panel structure, comprising:
   a stress relieving part comprising a bead, which is disposed on a car body panel and located between a plurality of connecting sides for connecting the car body panel and a frame component, wherein:
   the car body panel has a dash panel and a toe board, the frame component has a shock absorber housing, the shock absorber housing is fixed to an upper side of the frame component, and the connecting sides comprise an upper part connecting side connected between the upper side of the frame component and the dash panel and a side part connecting side connected between the toe board and an inner end side of the frame component,
   the stress relieving part is formed between the upper part connecting side and the side part connecting side,
   the car body panel has a curved bent part connected between the dash panel and the toe board, and the stress relieving part is configured on the car body panel by extending linearly in an up-down direction and spanning the curved bent part.

2. The car body panel structure according to claim 1, wherein:
   the side part connecting side is formed by a first side part connecting side and a second side part connecting side, the first side part connecting side is disposed adjacent to a wheel housing of the car body panel, the second side part connecting side is opposite to the first side part connecting side in a width direction of a car body, and the second side part connecting side is located more inside in the width direction of the car body than the first side part connecting side,
   the stress relieving part is formed between the second side part connecting side and the upper part connecting side.

3. The car body panel structure according to claim 1, wherein:
   the stress relieving part overlaps with the upper part connecting side and the side part connecting side at least in an up-down direction of a car body.

4. The car body panel structure according to claim 1, wherein:
   the stress relieving part is formed such that an end part in a longitudinal direction of the stress relieving part has a tapered shape.

5. The car body panel structure according to claim 1, wherein:
   the frame component has a connecting flange part formed by a separate component, and the frame component is connected to the car body panel through the connecting flange part to form the connecting sides.

6. The car body panel structure according to claim 1, wherein:
   the dash panel has a vertical surface part and an inclined surface part adjacent to the vertical surface part and not coplanar with the vertical surface part, the vertical surface part, the inclined surface part, and the toe board converge to form a convergence part, and the stress relieving part is formed between the convergence part and the connecting side.

7. The car body panel structure according to claim 1, wherein:
   the connecting sides bonding the car body panel and the frame component are formed through spot welding.

8. A car body panel structure, comprising:
   a stress relieving part comprising a bead, which is disposed on a car body panel and located between a plurality of connecting sides for connecting the car body panel and a frame component, wherein:
   the car body panel has a dash panel and a toe board, the frame component has a shock absorber housing, the shock absorber housing is fixed to an upper side of the frame component, and the connecting sides comprise an upper part connecting side connected between the upper side of the frame component and the dash panel and a side part connecting side connected between the toe board and an inner end side of the frame component, the stress relieving part is formed between the upper part connecting side and the side part connecting side, the dash panel has a vertical surface part and an inclined surface part adjacent to the vertical surface part and not coplanar with the vertical surface part, the vertical surface part, the inclined surface part, and the toe board converge to form a convergence part, and the stress relieving part is formed between the convergence part and the connecting side.

\* \* \* \* \*